(12) United States Patent  
Chen et al.

(10) Patent No.: US 8,582,464 B2  
(45) Date of Patent: Nov. 12, 2013

(54) TERMINAL DEVICE, METHOD AND APPARATUS FOR CONFIGURING TERMINAL DEVICE

(75) Inventors: Zhaohui Chen, Shenzhen (CN); Zhiming Ding, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 185 days.

(21) Appl. No.: 13/153,095

(22) Filed: Jun. 3, 2011

(65) Prior Publication Data

US 2011/0243115 A1    Oct. 6, 2011

Related U.S. Application Data

(63) Continuation of application No. PCT/CN2009/075133, filed on Nov. 25, 2009.

(30) Foreign Application Priority Data

Dec. 5, 2008    (CN) .......................... 2008 1 0177120

(51) Int. Cl.  
*G06F 11/00* (2006.01)  
*H04J 1/16* (2006.01)  
*H04L 1/00* (2006.01)  
*H04L 12/26* (2006.01)

(52) U.S. Cl.  
USPC ............................. 370/252; 370/253; 370/254

(58) Field of Classification Search  
USPC .......................................... 370/252, 254, 253  
See application file for complete search history.

(56) References Cited

U.S. PATENT DOCUMENTS

| 8,201,166 B2 * | 6/2012 | Garrett et al. ..................... 718/1 |
| 2005/0282536 A1 * | 12/2005 | McClure et al. ........... 455/422.1 |
| 2006/0120305 A1 * | 6/2006 | Van Den Bosch et al. ... 370/254 |
| 2006/0271665 A1 * | 11/2006 | Abe .............................. 709/223 |
| 2007/0053508 A1 | 3/2007 | Yasumoto |

(Continued)

FOREIGN PATENT DOCUMENTS

| CN | 101286908 A | 10/2008 |
| CN | 101317478 A | 12/2008 |

(Continued)

OTHER PUBLICATIONS

Office Action issued in corresponding Chinese Patent Application No. 200810177120.3, mailed May 3, 2012.

(Continued)

*Primary Examiner* — Chuong T Ho  
(74) *Attorney, Agent, or Firm* — Brinks Hofer Gilson & Lione

(57) ABSTRACT

A terminal device, a method and an apparatus for configuring the terminal device are disclosed. The method includes: receiving a message sent by a service provider device, where the message includes configuration information about a terminal device; setting up a wireless connection to the terminal device by using a Wireless Fidelity (WiFi) technology; and transmitting the configuration information about a terminal device to the terminal device through the wireless connection. The present invention brings the following benefits: receive a message that includes configuration information about a terminal device, and transmit the configuration information to the terminal device according to the message; therefore, the problem of insecurity and complexity involved in the provisioning for configuring the terminal device is resolved, and the configuration information for the terminal device is provisioned securely and simply.

8 Claims, 7 Drawing Sheets

(56) References Cited

U.S. PATENT DOCUMENTS

| | | | |
|---|---|---|---|
| 2007/0072607 A1 | 3/2007 | Radhakrishnan et al. | |
| 2007/0146782 A1 | 6/2007 | Lehotsky et al. | |
| 2008/0026742 A1 | 1/2008 | Thomas et al. | |
| 2008/0244271 A1* | 10/2008 | Yu | 713/176 |
| 2008/0304500 A1* | 12/2008 | Schliserman et al. | 370/401 |
| 2009/0150526 A1* | 6/2009 | Wu | 709/220 |
| 2009/0156189 A1 | 6/2009 | Ohman | |
| 2009/0292794 A1* | 11/2009 | Ding et al. | 709/221 |
| 2010/0030875 A1* | 2/2010 | Visser et al. | 709/220 |
| 2010/0039958 A1* | 2/2010 | Ge et al. | 370/254 |
| 2011/0276668 A1* | 11/2011 | Fang et al. | 709/221 |

FOREIGN PATENT DOCUMENTS

| | | |
|---|---|---|
| CN | 101065928 A | 6/2009 |
| EP | 1760982 A1 | 3/2007 |
| EP | 1983744 A1 | 10/2008 |
| JP | 2005236398 A | 9/2005 |
| JP | 2007074297 A | 3/2007 |
| JP | 2008219885 A | 9/2008 |
| JP | 2009512256 A | 3/2009 |
| JP | 2009545239 A | 12/2009 |
| WO | WO 2006/053585 A1 | 5/2006 |
| WO | WO 2007038780 A1 | 4/2007 |
| WO | WO 2008014014 A1 | 1/2008 |

OTHER PUBLICATIONS

Office Action issued in corresponding Chinese Patent Application No. 200810177120.3, mailed Sep. 13, 2012.
Office Action issued in corresponding Japanese Patent Application No. 2011-538824, mailed Oct. 30, 2012.
Broadband Forum, "CPE WAN Management Protocol" v1.1, TR-069, Dec. 2007.
Extended European Search Report issued in corresponding European Patent Application No. 09830004.9, mailed Oct. 27, 2011.
Written Opinion of the International Searching Authority issued in corresponding PCT Patent Application No. PCT/CN2009/075133, mailed Mar. 4, 2010.
International Search Report issued in corresponding PCT Patent Application No. PCT/CN2009/075133, mailed Mar. 4, 2010.
Office Action issued in corresponding Japanese Patent Application No. 2011-538824, mailed Aug. 13, 2013, 5 pages.

* cited by examiner

US 8,582,464 B2

TERMINAL DEVICE, METHOD AND APPARATUS FOR CONFIGURING TERMINAL DEVICE

CROSS-REFERENCE TO RELATED APPLICATIONS

This application is a continuation of International Application No. PCT/CN2009/075133, filed on Nov. 25, 2009, which claims priority to Chinese Patent Application No. 200810177120.3, filed on Dec. 5, 2008, both of which are hereby incorporated by reference in their entireties.

FIELD OF THE INVENTION

The present invention relates to a parameter configuration technology, and in particular, to a terminal device, a method and an apparatus for configuring the terminal device.

BACKGROUND OF THE INVENTION

Provisioning is a process of configuring an operation terminal device to enable the terminal device to provide services. For example, for a Home Gateway (HGW), it is necessary to configure relevant parameters such as the access account, access password, address of a server that provides services, Quality of Service (QoS), firewall, and route. For an Internet Protocol Television (IPTV) Set Top Box (STB), it is necessary to configure an address of an application server, an account and its password, an encryption method, and a key. It is rather difficult for a user to configure such data, and it is costly for a service provider to configure such data manually. Therefore, different organizations have developed automatic provisioning methods. For example, the Digital Subscriber Line (DSL) Forum has developed a Customer Premises Equipment (CPE) Wide Area Network (WAN) Management Protocol, which is abbreviated to CWMP, to implement automatic configuration for home network devices. A User Equipment (UE) downloads configuration parameters from an Auto-Configuration Server (ACS) located in a public network to obtain configuration, and the UE can obtain the Uniform Resource Locator (URL) of the ACS through a Dynamic Host Configuration Protocol (DHCP), factory settings, and manual input.

In the process of implementing the present invention, the inventor finds at least the following problems in the prior art: When the URL of the ACS is obtained automatically through DHCP, neither the service provider nor the user needs to input any data into the UE, but the process of obtaining the URL of the ACS is not secure due to the DHCP protocol itself. Therefore, the service provider does not expect the UE to obtain the URL of the ACS automatically through DHCP. If the UE obtains the URL through factory settings, the UE needs to be customized, and is not suitable for retail. If the user inputs the URL of the ACS manually, the input is technically difficult for the user although the amount of input data is small. If the service provider inputs the URL, the service provider needs to bear additional costs and the efficiency is low. Therefore, the provisioning for configuring the terminal device such as an HGW and an IPTV STB is insecure and complicated.

SUMMARY OF THE INVENTION

Embodiments of the present invention aim to overcome insecurity and complexity of the provisioning which configures the terminal device.

A method for configuring a terminal device is provided in an embodiment of the present invention. The method includes: receiving a message sent by a service provider device, where the message includes configuration information about a terminal device; setting up a wireless connection to the terminal device by using a Wireless Fidelity (WiFi) technology; and transmitting the configuration information about a terminal device to the terminal device through the wireless connection.

An apparatus for configuring a terminal device is provided in an embodiment of the present invention. The apparatus includes: a message receiving unit, configured to receive a message sent by a service provider device, where the message includes configuration information about a terminal device; a wireless connecting unit, configured to set up a wireless connection to the terminal device by using a WiFi technology; and a configuration information transmitting unit, configured to transmit the configuration information about a terminal device to the terminal device through the wireless connection.

A terminal device is provided in an embodiment of the present invention. The terminal device includes: a wireless connection obtaining unit, configured to obtain configuration information about a terminal device by using a wireless connection set up by using a WiFi technology; and a terminal device configuring unit, configured to configure the terminal device by using the configuration information about a terminal device.

The foregoing technical solution provides at least the following benefits: receive a message including configuration information about a terminal device, and transmit the configuration information to the terminal device according to the message; therefore, the problem of insecurity and complexity involved in the provisioning for configuring the terminal device is resolved, and the configuration information for the terminal device is provisioned securely and simply.

BRIEF DESCRIPTION OF THE DRAWINGS

The drawings listed below are intended to help understand the present invention, and constitute a part of this application without limiting the present invention.

DETAILED DESCRIPTION OF THE EMBODIMENTS

To make the objectives and merits of the technical solution of the present invention clearer, the following describes the embodiments of the present invention in detail with reference to the accompanying drawings. The exemplary embodiments of the present invention and the description thereof are illustrative in nature, and shall not be construed as limitations on the present invention.

Embodiment 1

Figure 1A:
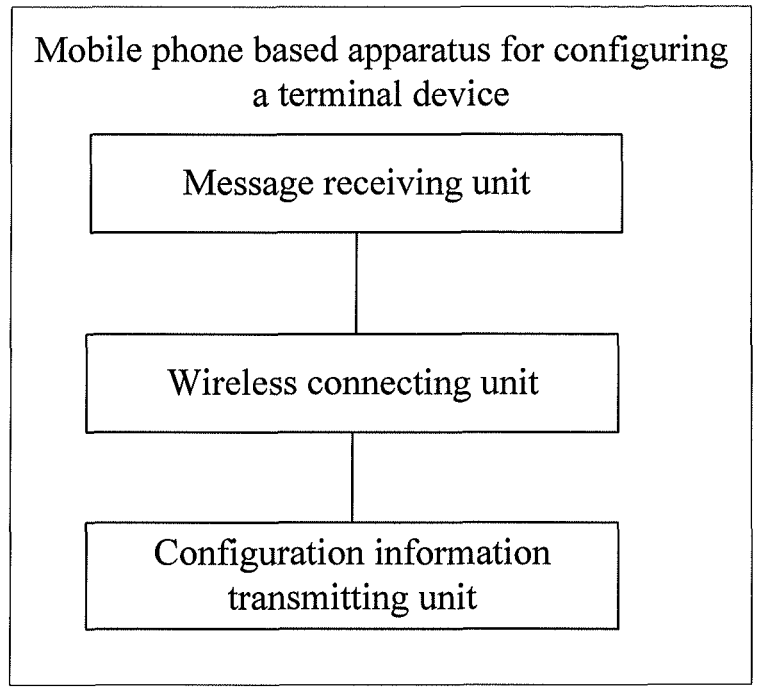
FIG. 1A is a schematic structural diagram of an apparatus for configuring a terminal device according to an embodiment of the present invention.

FIG. 1A is a schematic structural diagram of an apparatus for configuring a terminal device in an embodiment of the present invention. The apparatus includes: a message receiving unit, configured to receive a message sent by a service provider device, where the message includes configuration information about a terminal device; a wireless connecting unit, configured to set up a wireless connection to the terminal device by using a WiFi technology; and a configuration information transmitting unit, configured to transmit the configuration information about a terminal device to the terminal device through the wireless connection.

Optionally, the message receiving unit may include: a Multimedia Message Service (MMS) module, configured to receive an MMS message from the service provider device; or an SMS module, configured to receive an SMS message from the service provider device. The message receiving unit may include: a message parsing module, configured to: parse a flag bit of a frame header in the MMS message or the SMS message or a prefix identifier (ID) of a text information field in the MMS message or the SMS message in order to identify that the MMS message or SMS message includes the configuration information about a terminal device; and a message extracting module, configured to extract the configuration information about a terminal device obtained by the message parsing module. The message parsing module may be further configured to parse the configuration information about a terminal device to obtain a device ID of the terminal device, and configuration parameters of the terminal device or a URL of an ACS. The configuration information transmitting unit may include: a WiFi security setting module, configured to transmit the configuration information about a terminal device to the terminal device by using a WiFi security setting method. The WiFi security setting module may be a WiFi security setting register. A terminal is provided in this embodiment. The terminal includes the foregoing apparatus for configuring a terminal device.

Figure 1B:
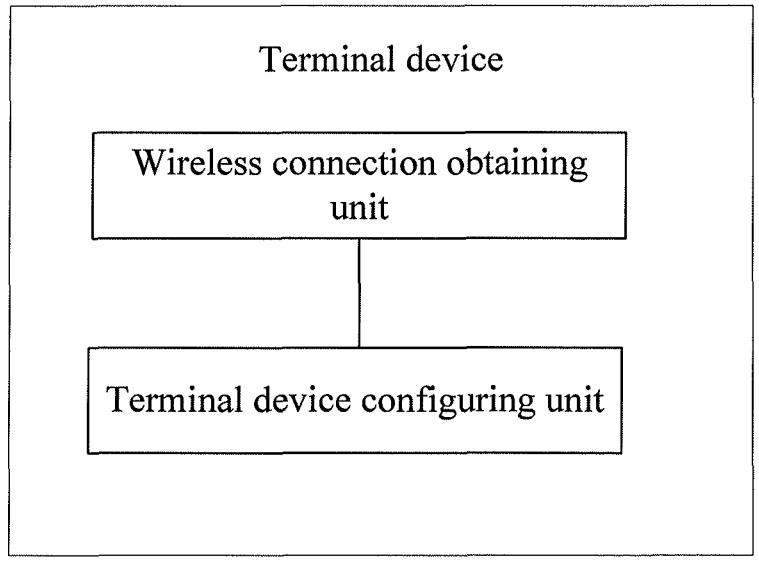
FIG. 1B is a schematic structural diagram of a terminal device according to an embodiment of the present invention.

FIG. 1B is a schematic structural diagram of a terminal device in an embodiment of the present invention. The terminal device includes: a wireless connection obtaining unit, configured to obtain configuration information about a terminal device by using a wireless connection set up by using a WiFi technology; a terminal device configuring unit, configured to configure the terminal device by using the configuration information about a terminal device.

Optionally, the wireless connection obtaining unit may include: a first obtaining subunit, configured to obtain configuration parameters of the terminal device or a URL of an ACS in the configuration information about a terminal device; and a second obtaining subunit, configured to obtain the configuration parameters from the ACS over a CWMP protocol according to the URL of the ACS if the terminal device obtains the URL of the ACS.

Figure 2:
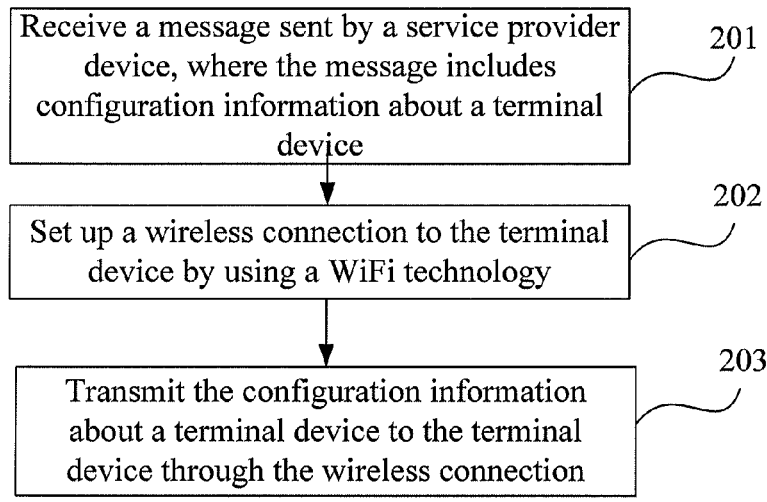
FIG. 2 is a flowchart of a method for configuring a terminal device according to an embodiment of the present invention.

FIG. 2 is a flowchart of a method for configuring a terminal device in an embodiment of the present invention. The method includes the following steps:

Step 201: Receive a message sent by a service provider device, where the message includes configuration information about a terminal device.

A message sent by the service provider device may be an MMS message or an SMS message. A flag bit of a frame header in the MMS message or the SMS message or a prefix ID of a text information field in the MMS message or the SMS message may be parsed in order to identify that the MMS message or SMS message includes the configuration information about a terminal device. The configuration information about a terminal device may include a device ID of the terminal device, and may further include configuration parameters of the terminal device or the URL of an ACS.

Step 202: Set up a wireless connection to the terminal device by using a WiFi technology.

Step 203: Transmit the configuration information about a terminal device to the terminal device through the wireless connection.

A method for transmitting the configuration information about a terminal device may include the WiFi security setting method. The WiFi security setting method for transmitting the configuration information may employ a WiFi security setting register.

The configuration parameters may be obtained from the ACS over a CWMP protocol according to the URL of the ACS if the terminal device obtains the URL of the ACS.

In this embodiment, receive a message including configuration information about a terminal device, and transmit the configuration information to the terminal device according to the message; therefore, the problem of insecurity and complexity involved in the provisioning for configuring the terminal device is resolved, and the configuration information for the terminal device is provisioned securely and simply.

Embodiment 2

WiFi has become an important connection technology in home networks, and is supported by more and more application terminal devices. Most home access devices such as an HGW provide an AP to establish a home Wireless Local Area Network (WLAN). As a connection technology in the home network, WiFi is generally independent of the service provider. Therefore, users need to configure the WiFi network by themselves. To facilitate the setup and configuration of a secure WLAN performed by the users, the WiFi Alliance has developed WiFi Protected Setup (WPS) specifications, through which the users can perform the least and simplest operations to establish a secure WLAN and set security parameters on the devices added to the WLAN.

The HGW and some application terminal devices support WiFi, and the WiFi network is configured by a user. Therefore, it is practicable that the user configures service data of the HGW and the application terminal devices while performing WiFi configuration for the AP on the HGW and other WiFi-enabled application terminal devices. The WPS specifications stipulate that non-WiFi network configuration parameters and application configuration parameters may be included in the configuration information in the process of configuring a device by using a WPS method. Mobile phones are popular application terminal devices, and more and more mobile phones support WiFi. Mobile phones have rich user interfaces, and are suitable for serving as a WPS register. Therefore, it is possible to use a WiFi mobile phone including the units shown in FIG. 1A to configure the terminal device including the units shown in FIG. 1B (for example, the HGW, and operation application terminal device). The configuration information transmitting unit may include a WPS register to implement its functions.

Figure 3:
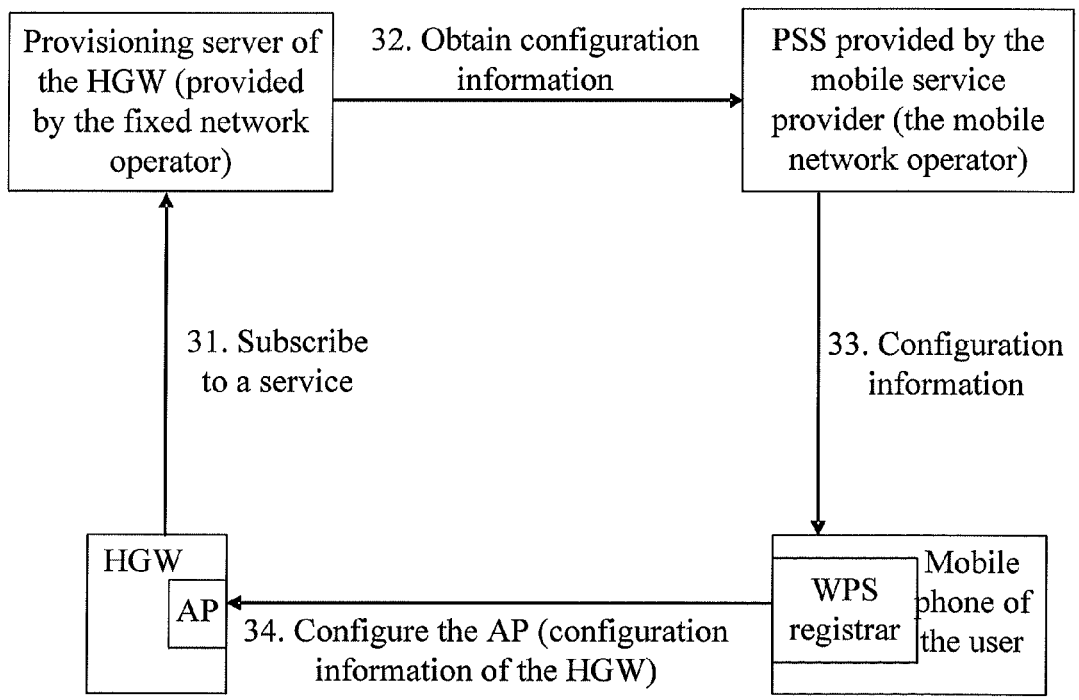
FIG. 3 shows a process of configuring an HGW through a mobile phone according to an embodiment of the present invention.

FIG. 3 shows a process of configuring an HGW through a mobile phone in an embodiment of the present invention. The process includes the following steps:

Step 31: A user subscribes to a service.

When the user needs to access the Internet or use an application service such as an IPTV service, the user needs to buy a terminal device (such as an HGW and an IPTV STB) first, and then subscribe to the service with a service provider. For example, the user applies to an access service provider for an access service, or applies to an IPTV service provider for an IPTV service.

For example, when applying for an access service, the user buys an HGW and subscribes to the access service with the access service provider. The access service provider records a device ID of the HGW of the user and a mobile phone number of the user. The device ID of the HGW is printed on the package, and can be seen without unpacking the package.

The access service provider handles the subscription, generates configuration information for the HGW of the user, and sets the configuration information into the operation system. After completing the subscription, the user takes home a complete package of the device.

Other subscription processes are also applicable. For example, the user makes a service subscription call to the access service provider, and reports the device ID of the HGW, the mobile phone number for provisioning, and the possible paying bank account.

Step 32 to step 33: The mobile phone obtains configuration information.

After subscription, through a mobile network, the service provider sends the configuration information to the mobile phone number registered at the time of subscription. If the configuration information is generated when the subscription is completed, the mobile phone receives the configuration information when the subscription is completed.

The access service provider transmits the configuration information of the HGW to the mobile phone through MMS or in other communication modes, which is known as PS herein. The PS is parallel to the SMS and MMS.

The PS is provided by an application service provider (or a mobile communication network operator). Similarly to an MMS service, the application service provider provides a Provisioning Service Server (PSS), and the access service provider sends the configuration information of the HGWr and the mobile phone number to the PSS. The PSS sends the configuration information to the mobile phone according to the mobile phone number of the user.

To support such a service, the mobile phone of the user needs to support the provisioning protocol like an MMS protocol and support authentication and encrypted transmission. The provisioning protocol is not detailed herein. The persons who understand the MMS protocol in the art can deduce the provisioning protocol.

Step 34: Use a mobile phone to configure the terminal device such as an HGW through a mobile phone by using a WPS configuration method.

Figure 4:
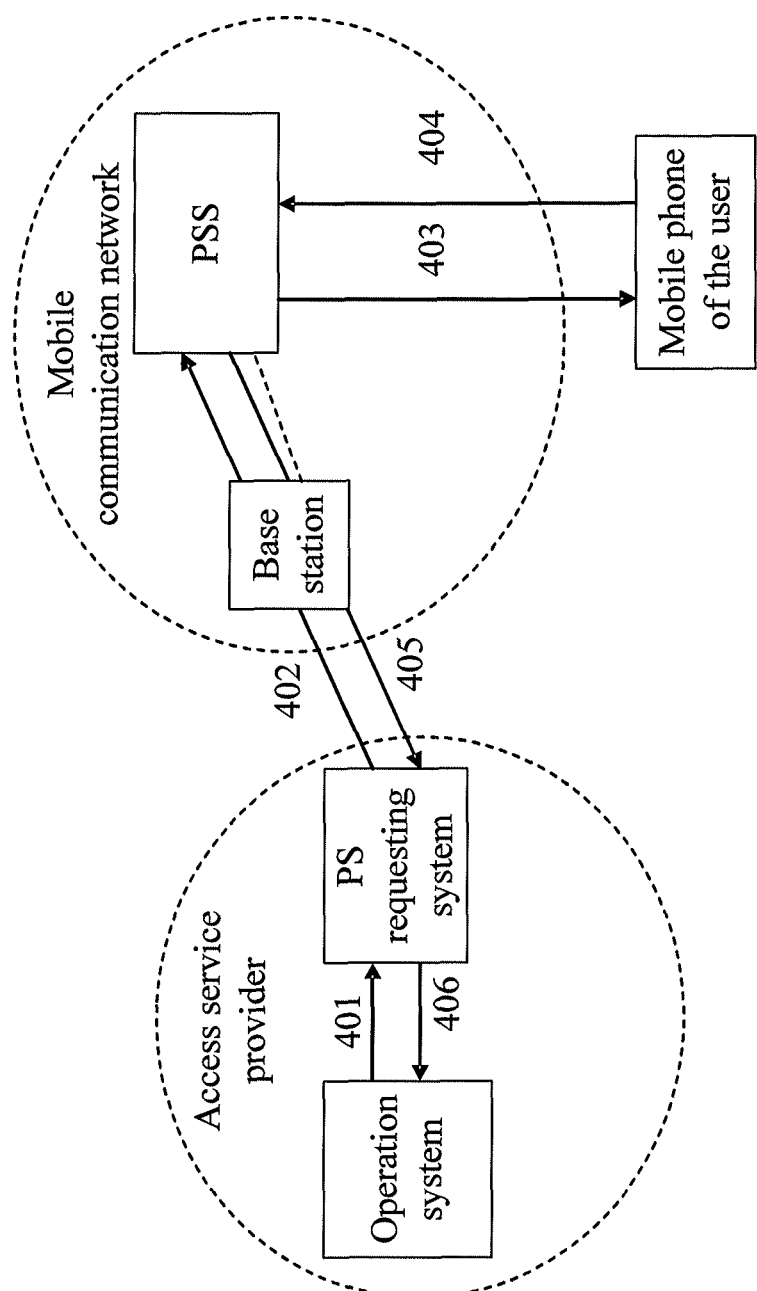
FIG. 4 shows a process of transmitting messages about Provisioning Service (PS)

FIG. 4 shows a process of transmitting messages about PS. FIG. 4 shows how an access service provider transmits HGW configuration information to a mobile phone of a user. The process includes the following steps:

Step 401: The operation system of the access service provider generates configuration information of the HGW of the user, and transmits the device ID of the HGW, configuration parameters, and the mobile phone number of the user to a PS requesting system automatically.

Step 402: The PS requesting system transmits the device ID of the HGW, configuration parameters, and destination mobile phone number to the PSS by using a data service of the mobile communication network, which is similar to a process of delivering an MMS message using a mobile phone.

Step 403: The PSS transmits the device ID of the HGW and configuration parameters to the mobile phone of the user. The PSS may push the configuration parameters to the mobile phone of the user directly; or the PPS send a notification including a link to the mobile phone of the user first, then the mobile phone actively extracts configuration information from the PSS according to the link, for example, through a Hypertext Transfer Protocol (HTTP) Get operation. The configuration parameters are encrypted and sent to the mobile phone of the user.

Step 404: The mobile phone of the user sends a message to the PSS after obtaining the configuration information, where the message indicates that mobile phone receives the configuration information successfully.

Step 405: The PSS sends a message to the PS requesting system, where the message indicates that the configuration information is transmitted to the destination successfully.

Step 406: The PS requesting system sends feedback to the operation system to indicate that the configuration information is transmitted to the mobile phone of the user successfully.

Figure 5:
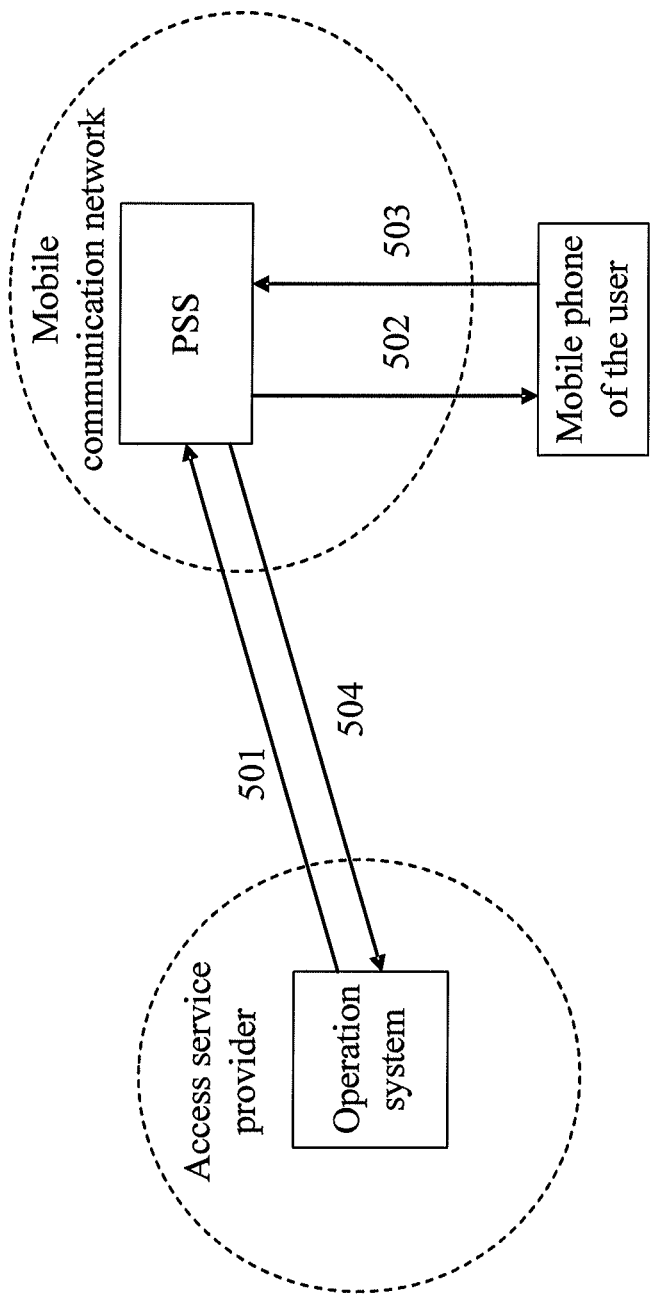
FIG. 5 shows another process of transmitting messages about PS.

The operation system of the access service provider may set up a connection to the PSS of the mobile communication network operator directly, and send the configuration information to the mobile phone of the user in another way. FIG. 5 shows another process of transmitting messages about PS. The process includes the following steps:

Step 501: The operation system of the access service provider sends the device ID of the HGW of the user, configuration parameters, and the destination mobile phone number to the PSS of the mobile communication network directly through an Internet connection. This process is similar to a process of the user logging in to the MMS server through a computer and sending an MMS message to a destination mobile phone directly.

Step 502 and step 503: These steps are the same as step 403 and step 404 respectively.

Step 504: The PSS sends a message to the operation system of the access service provider after determining that the mobile phone receives the configuration information, where the message indicates that the configuration information is transmitted to the destination successfully.

The process in FIG. 4 is similar to a process of sending an MMS message from one mobile phone to another; and the process in FIG. 5 is similar to a process that the user sends an MMS message to the destination mobile phone directly through the Internet. The details of the process are known to persons skilled in the art.

The examples shown in FIG. 4 and FIG. 5 are intended to prove that it is technically practicable for an access service provider to send configuration information of an HGW of the user to a mobile phone of the user, but they shall not be construed as limitations on the implementation method.

The following describes a WPS configuration method. After receiving the configuration information, the mobile phone notifies a WPS register module on the mobile phone.

Figure 6:
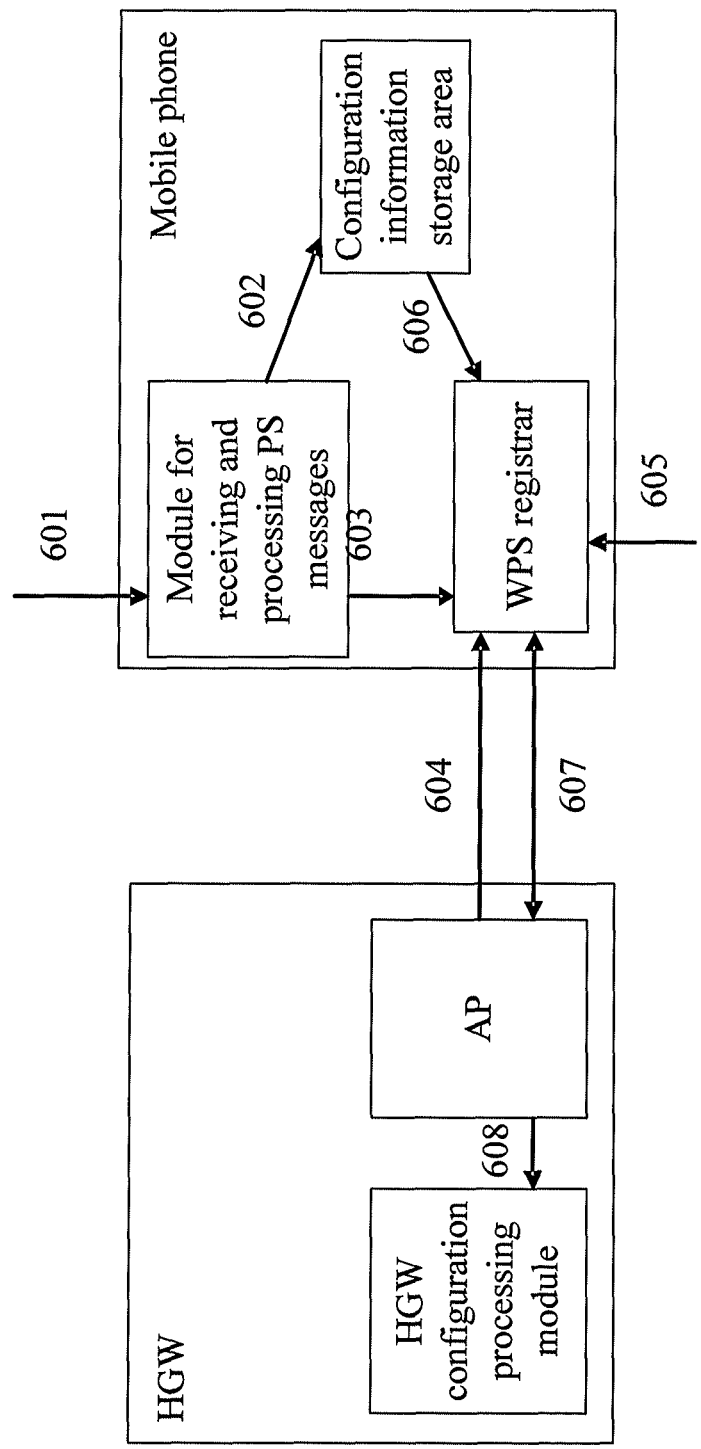
FIG. 6 shows how a mobile phone shown in FIG. 3 uses a WiFi Protected Setup (WPS) method to transmit configuration information to an HGW.

After the HGW is powered on and enabled, an AP sends a beacon frame automatically. The register module on the WiFi mobile phone discovers the AP, and asks the user whether to configure the AP. The user answers "Yes", and the mobile phone configures the AP. The configuration parameters of the HGW are transmitted to the AP in the configuration process. Because the AP is a module on the HGW, the HGW obtains the configuration parameters easily. The configuration process in the WPS method is not detailed here. The present invention does not change any step of the WPS, but the configuration parameters transmitted from the register to the AP according to the operations allowed by the WPS include the configuration information of the HGW. FIG. 6 shows how a mobile phone shown in FIG. 3 uses a WPS method to transmit configuration information to an HGW. The process includes the following steps:

Step 601: A module for receiving and processing messages about PS on the mobile phone receives a PS message, extracts the configuration information from the message, and decrypts the configuration information.

Step 602: The module for receiving and processing messages about PS stores the configuration information into a configuration information storage area.

Step 603: The module for receiving and processing messages about PS notifies the received configuration information to a WPS register module, and indicates the following information to the WPS register module: the device ID corresponding to the configuration information and the address for storing the configuration parameters.

Step 604: After the HGW is powered on by the user, the AP module on the HGW sends a beacon frame to the outside periodically. The beacon frame includes the device ID of the HGW, and indicates that the AP module supports the WPS configuration method but has never obtained any configuration by using the WPS method.

Step 605: Because the mobile phone supports WiFi, the mobile phone can receive the beacon frame of the AP, or find existence of the AP through active probing. If the WPS register on the mobile phone discovers an AP supporting the WPS and discovers that the AP allows an external WPS register to configure it, the WPS asks the user whether to configure the AP. If the user answers "Yes", the configuring the AP performed by the WPS register is triggered.

Step 606: Because the user agrees to configure the discovered AP, the WPS register reads corresponding configuration parameters from the configuration information storage area according to the device ID, and is ready for sending the configuration parameters together with the configuration information to the AP.

Step 607: The WPS register on the mobile phone configures the AP on the HGW by using a WPS method, and transmits configuration parameters of the HGW together with the configuration information. This process is a process of exchanging multiple messages, and requires the user to input the initial password of the AP (namely, the HGW) on the register (namely, the mobile phone). According to the WPS specifications, the password of the AP (namely, the HGW) can be obtained by reading the label on the device or the instruction manual.

Step 608: The AP receives the configuration parameters from the register. If the configuration parameters include non-WLAN configuration parameters, the AP forwards the non-WLAN configuration parameters to the HGW configuration processing module. Because the AP is located with the configuration processing module of the HGW inside the same device, this process is easy to handle. The process is not detailed here.

For the detailed process of communication between the AP and the mobile phone, refer to the IEEE 802.11 protocol and the WPS specifications developed by the WiFi Alliance.

The configuration information of the HGW may include complete configuration parameters of the HGW, or include only the URL of the ACS of the HGW. If the configuration information obtained by the mobile phone includes only the URL of the ACS of the HGW, the foregoing process solves only the problem of inputting the URL of the ACS into the HGW. Afterward, the HGW may obtain the configuration parameters from the ACS through the CWMP protocol developed by the DSL Forum, which is not described further.

The foregoing embodiment brings the following benefits: All configuration parameters can arrive at the device securely and simply. Although the user still needs to perform operations when using a mobile phone as a WPS register to configure the AP and the application terminal device, the operations do not require special skill of the user, and the operations are simple because they are equivalent to answering questions as prompted automatically.

Embodiment 3

The following describes a method that does not require a mobile operator to provide special support. In the second embodiment above, the mobile phone configures the HGW when the mobile operator supports the PS. For the purpose of transmitting the URL of the ACS that manages the HGW to the HGW through a mobile phone only, the mobile phone may obtain the URL of the ACS through a process different from the foregoing method.

Because the URL is a string which is generally not long, and an SMS message supports up to 70 Chinese characters (namely, 140 English characters) which are enough for expressing a URL, the URL of the ACS of the HGW can be sent to a WiFi mobile phone of the user through an SMS message, and then the WiFi mobile phone transmits the URL together with configuration information to the HGW when configuring the AP on the HGW in WPS mode.

Figure 7:
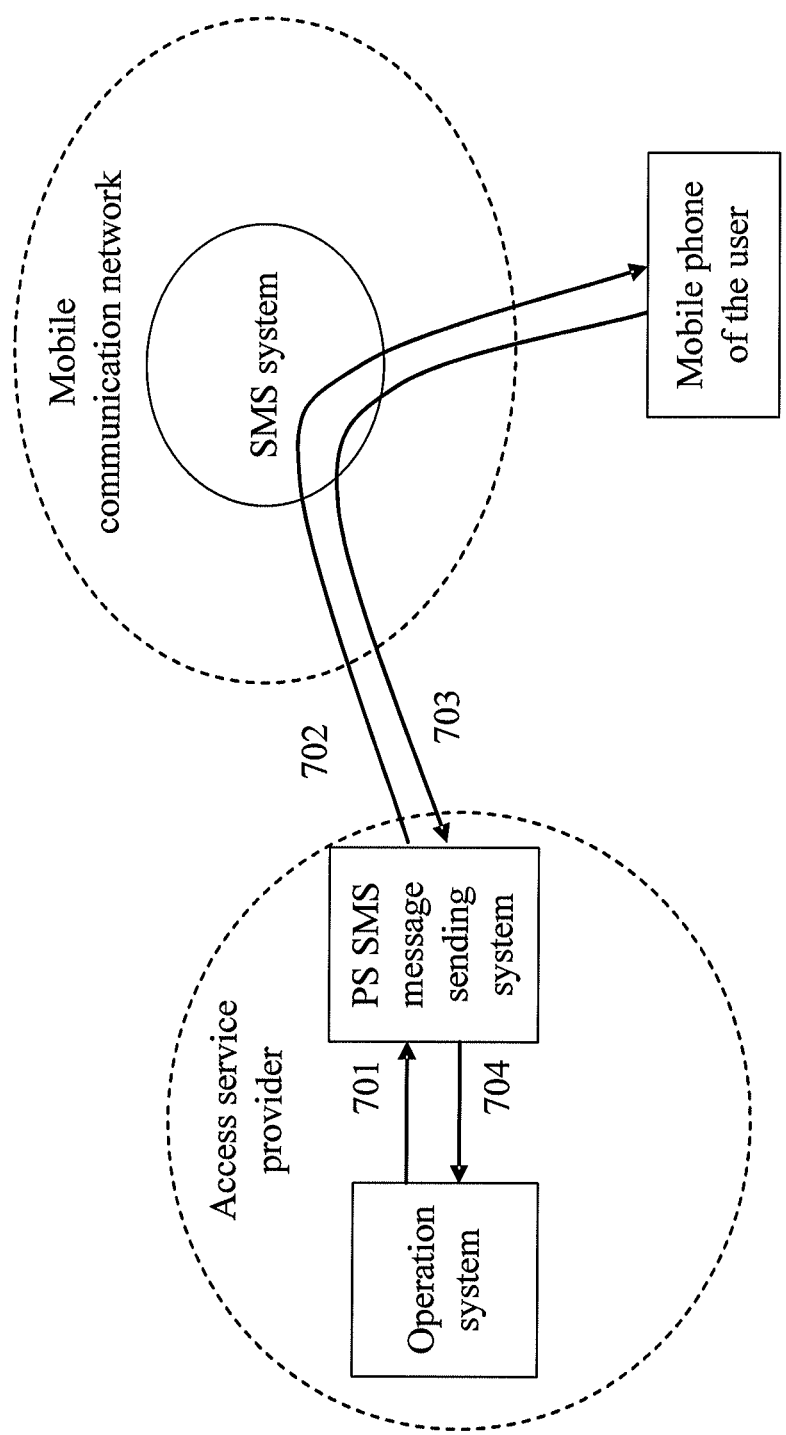
FIG. 7 shows how to send a URL of an ACS of an HGW to a mobile phone through Short Message Service (SMS) according to an embodiment of the present invention.

FIG. 7 shows how to send a URL of an ACS of an HGW to a mobile phone through SMS in an embodiment of the present invention. The process includes the following steps:

Step 701: After generating the configuration parameters from the register, the operation system of the access service provider transmits the device ID of the HGW, URL of the ACS, and the mobile phone number of the user to a PS SMS message sending system automatically.

Step 702: The PS SMS message sending system organizes the device ID of the HGW and the URL of the ACS into an SMS message in a special format, and sends the message to the mobile phone of the user. The frame header of the SMS message may include a flag bit indicating the purpose of the message, or a special prefix ID is added into the text information field of the SMS message directly. The form of the identification is not detailed here. The PS SMS message sending system may apply for an SMS success report service. In this way, once an SMS message arrives at the mobile phone of the user successfully, the SMS system returns a message to the SMS sender (namely, the PS SMS message sending system), indicating that the sent SMS message arrives at the destination successfully.

The SMS message is forwarded by the SMS system of the mobile network to the called party (namely, the mobile phone of the user). Because SMS systems in the prior art are diversified, the structure of the SMS system is not detailed here.

Step 703: If the PS SMS message sending system applies for an SMS success report service, the SMS system requires the SMS receiver (namely, the mobile phone of the user) to return an Acknowledge (ACK) message after receiving the SMS message. In this way, the SMS system can send a special message to the PS SMS message sending system, indicating that the sent SMS message arrives at the destination successfully.

Step 704: The PS SMS message sending system receives the message indicating arrival of the SMS message at the destination, and sends a notification to the operation system to indicate that the information is transmitted to the destination mobile phone successfully.

Even without step 703 and step 704, the service provider may send such a message to the mobile phone of the user when the user subscribes to the service in the business center, and the user confirms reception of the message before leaving the business center.

After the mobile phone receives the SMS message, the application of the mobile phone parses content of the SMS message and recognizes that the message is a provisioning SMS message. Therefore, the application extracts the device ID and URL from the message, and sends them to the WPS register module. Afterward, when the register module configures the AP, if the device ID is compliant with the URL, the register module adds the obtained URL into the WLAN configuration parameters, and sends the parameters to the AP. The device where the AP is located uses the URL.

Figure 8:
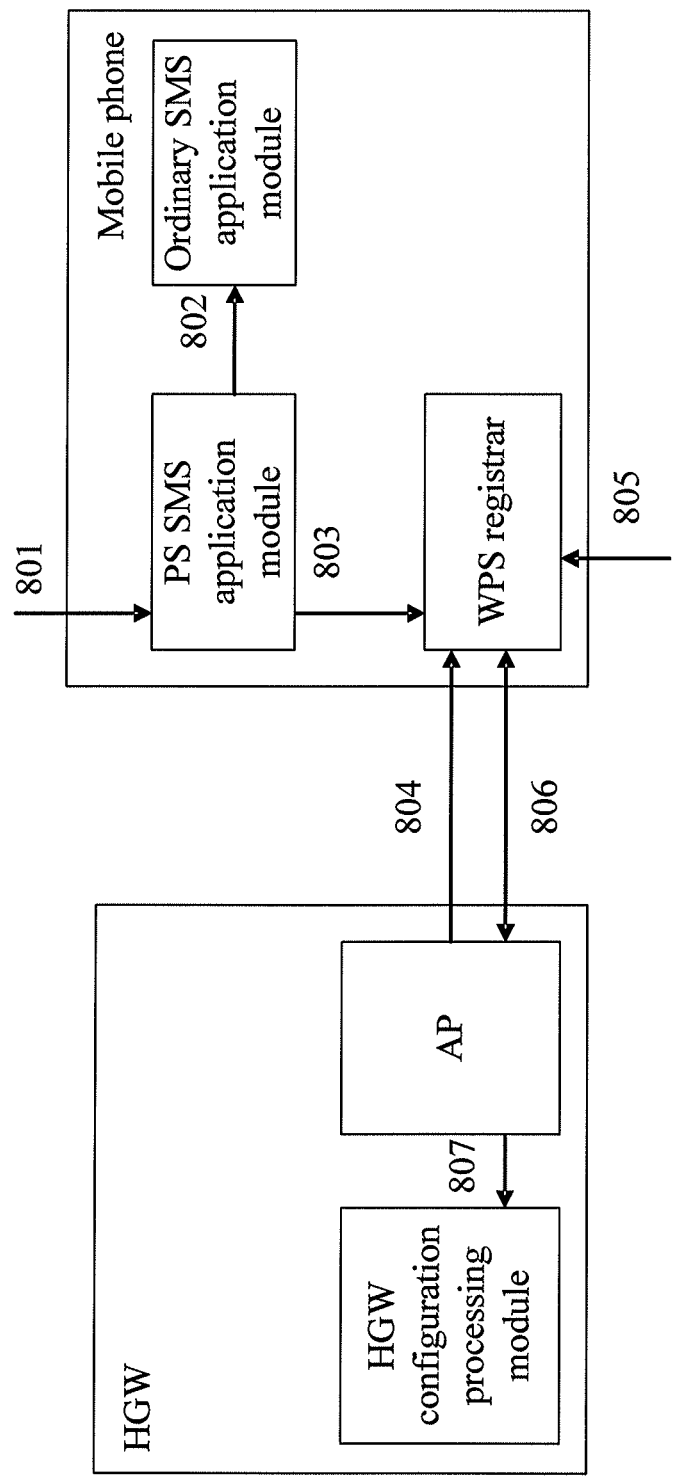
FIG. 8 shows how a mobile phone processes SMS messages and configures an Access Point (AP) according to an embodiment of the present invention.

FIG. 8 shows how a mobile phone processes SMS messages and configures an AP in an embodiment of the present invention. The process includes the following steps:

Step 801: A PS SMS application module for processing the messages about PS on the mobile phone is loaded onto a mobile phone that supports provisioning. The mobile phone needs to load the module and use the module to replace the ordinary SMS application module to receive SMS messages. Alternatively, an ordinary SMS application module is upgraded to be capable of identifying provisioning SMS messages. Alternatively, an ordinary SMS application module may have open interfaces which make it easier to add special SMS applications on the mobile phone. The ordinary SMS application module receives the SMS messages, and the SMS messages are forwarded to the added application module through open interfaces. An example is provided here to describe how to process provisioning SMS messages on the mobile phone.

Step 802: After parsing the SMS message, the PS SMS application module forwards the SMS message to the ordinary SMS application module if the SMS message is not a provisioning SMS message.

Step 803: After parsing the SMS message, the PS SMS application module extracts the device ID and the URL from the message and forwards them to the WPS register module if the SMS message is a provisioning SMS message. The WPS register module stores the device ID and the URI for future use.

Step 804: After the HGW is powered on by the user, the AP module on the HGW sends a beacon frame to the outside periodically. The beacon frame includes the device ID of the AP/HGW, and indicates that the AP module supports the WPS configuration method but has never obtained any configuration by using the WPS method.

Step 805: Because the mobile phone supports WiFi, the mobile phone can receive the beacon frame of the AP, or find existence of the AP through active probing. If the WPS register on the mobile phone discovers that an AP supports the WPS and is not configured in WPS mode, the WPS register asks the user whether to configure the AP. If the user answers "Yes", the configuring the AP performed by the WPS register is triggered.

Step 806: The WPS register on the mobile phone configures the AP on the HGW by using a WPS method, and transmits the obtained URL corresponding to the device ID of the HGW together with the configuration information, where the URL is the URL of the ACS of the HGW. This process is a process of exchanging multiple messages, and requires the user to input the initial password of the AP (namely, the HGW) on the register (namely, the mobile phone). According to the WPS specifications, the password of the AP (namely, the HGW) can be obtained by reading the label on the device or the instruction manual.

Step 807: The AP receives the configuration information from the register. If the configuration information includes non-WLAN configuration information, the AP forwards the non-WLAN configuration information to the HGW configuration processing module. In this method, the non-WLAN configuration information is only a URL.

Through the foregoing process, the HGW obtains the URL of the ACS, and then can obtain the complete configuration parameters from the ACS through a CWMP protocol. The configuration is therefore completed.

The foregoing method is also applicable to configuring other WiFi-enabled operation application terminal devices in the home network, for example, an IPTV STB. The IPTV service provider also needs to send the service configuration parameters of the IPTV STB or the URL of the ACS corresponding to the STB to the mobile phone of the user. The user sets the IPTV service data into the STB while performing WLAN configuration for the IPTV STB in WPS mode.

The foregoing embodiment brings the following benefits: The URL of the ACS arrives at the device securely and simply without being input by the user, operator/service provider, or vendor into the device. Although the user still needs to perform operations when using a mobile phone as a WPS register to configure the AP and the application terminal device, the operations do not require special skill of the user, and the operations are simple because they are equivalent to answering questions as prompted automatically.

Described above are the objectives, technical solution and benefits of the embodiments of the present invention. Although the invention has been described through some exemplary embodiments, the invention is not limited to such embodiments. It is apparent that those skilled in the art can make modifications, replacements, and improvements to the invention without departing from the scope of the invention. The invention is intended to cover the modifications, replacements, and improvements provided that they fall within the scope of protection defined by the following claims or their equivalents.

What is claimed is:

1. A method for configuring a terminal device, performed by an apparatus for configuring the terminal device, comprising:

receiving a message sent by a service provider device, wherein the message comprises configuration information about a the terminal device;

discovering an access point (AP) contained in the terminal device;

transmitting to the AP, configuration parameters for setting up WLAN in accordance with WiFi Protected Setup (WPS) specifications, so as to set up a wireless connection to the terminal device; wherein the configuration information about the terminal device is transmitted together with the configuration parameters, to the AP of the terminal device;

wherein the configuration information about the terminal device comprises a device identifier (ID) of the terminal device and a Uniform Resource Locator (URL) of an Auto-Configuration Server (ACS); and the configuration parameters of the terminal device are obtained from the ACS over a Customer Premises Equipment Wide Area Network Management Protocol (CWMP) according to the URL of the ACS if the terminal device obtains the URL of the ACS.

2. The method according to claim 1, wherein:
the message sent by the service provider device is a Multimedia Message Service (MMS) or a Short Message Service (SMS).

3. The method according to claim 2, wherein:
a flag bit of a frame header in the MMS message or the SMS message is parsed or a prefix identifier (ID) of a text information field in the MMS message or the SMS message is parsed in order to identify that the MMS message or SMS message comprises the configuration information about a terminal device.

4. The method according to claim 1, wherein:
the configuration information about the terminal device together with the configuration parameters are transmitted to the AP of the terminal device by a WiFi Protected Setup (WPS) registrar.

5. An apparatus for configuring a terminal device, comprising:
a message receiving unit, configured to receive a message sent by a service provider device, wherein the message comprises configuration information about the terminal device;
a wireless connecting unit, discovering an access point (AP) contained in the terminal device;
a configuration information transmitting unit, configured to transmit, to the AP, configuration parameters for setting up WLAN in accordance with WiFi Protected Setup (WPS) specifications, so as to set up a wireless connection to the terminal device;
wherein the configuration information about the terminal device is transmitted together with the configuration parameters, to the AP of the terminal device;

wherein:
the message receiving unit comprises:
a message parsing module, the message parsing module is configured to parse the configuration information about the terminal device to obtain a device ID of the terminal device and a Uniform Resource Locator (URL) of an Auto-Configuration Server (ACS).

6. The apparatus according to claim 5, wherein the message receiving unit comprises:
a Multimedia Message Service (MMS) module, configured to receive an MMS message from the service provider device; or
a Short Message Service (SMS) module, configured to receive an SMS message from the service provider device.

7. The apparatus according to claim 6, wherein
the message parsing module is further configured to: parse a flag bit of a frame header in the MMS message or the SMS message or a prefix identifier (ID) of a text information field in the MMS message or the SMS message in order to identify that the MMS message or SMS message comprises the configuration information about the terminal device; and
a message extracting module, configured to extract the configuration information about the terminal device obtained by the message parsing module.

8. The apparatus according to claim 5, wherein:
the configuration information transmitting unit is a WiFi Protected Setup (WPS) registrar.

\* \* \* \* \*